United States Patent [19]
Dixon et al.

[11] Patent Number: 5,882,437
[45] Date of Patent: Mar. 16, 1999

[54] OXY-FUEL CUTTING TORCH HEAD SEAT INSERT AND METHOD OF USE

[75] Inventors: Thomas J. Dixon, St. Lazare; Caterina Papachristos, Montreal; Guy DesLauriers, Longueuil; Samir Gerges, Boucherville, all of Canada

[73] Assignee: Air Liquide Canada, Inc., Montreal, Canada

[21] Appl. No.: 929,018

[22] Filed: Sep. 15, 1997

[51] Int. Cl.⁶ .................................................. B23K 7/00
[52] U.S. Cl. .............................................. 148/194; 266/48
[58] Field of Search ................................. 266/48, 77, 44; D23/269; 239/DIG. 4, 397.5; 148/194

[56] References Cited

U.S. PATENT DOCUMENTS

| | | | |
|---|---|---|---|
| D. 292,308 | 10/1987 | Beltran | D23/269 |
| D. 363,771 | 10/1995 | Mathers | D23/269 |
| 1,675,668 | 7/1928 | Smith | 266/48 |
| 3,948,496 | 4/1976 | Miller | 266/48 |
| 4,192,488 | 3/1980 | Roeder et al. | 266/77 |
| 4,443,003 | 4/1984 | Bleys | 266/48 |

OTHER PUBLICATIONS

"Easiest to Use, Most Efficient and Longest Lasting Tips You Can Buy", Smith Equipment, Watertown, South Dakota (Form 4433–1), Nov. 1996.

*Primary Examiner*—Scott Kastler
*Attorney, Agent, or Firm*—Burns, Doane, Swecker & Mathis

[57] ABSTRACT

A molded, non-metallic insert is disclosed that is of a form which replicates the seat configuration of the oxy-fuel cutting torch into which it is intended to be inserted. The insert material is compressible and resilient and allows a cutting tip, without special requirements, to be installed into the cutting torch so equipped with the insert. The insert is resistant to the difficult environmental conditions in which it is required to operate, in the industrial situations in which it is used. The insert resists elevated temperatures and the chemical and physical effects of the gases it contacts while sealing the flowpaths of the oxygen and fuel flowing through the torch head and cutting tip.

19 Claims, 3 Drawing Sheets

OXY-FUEL CUTTING TORCH HEAD SEAT INSERT AND METHOD OF USE

BACKGROUND OF THE INVENTION

1. Field of the Invention

The present invention relates to cutting torches and cutting tips, and more particularly to a molded insert formed of a resilient, non-metallic material which is placed into the metal head of an oxy-fuel cutting torch and allows a standard metal cutting tip to be installed leak-free into the cutting torch head.

2. Brief Description of the Related Art

Oxy-fuel cutting torches are used with cutting tips to perform cutting operations in the metalworking industry. The cutting torch conveys fuel gas and oxygen to the tip where the mixture of the two combusts at the tip exit orifices to pre-heat the metal to be cut. Pure oxygen is also discharged from the cutting tip to sever the pre-heated metal by an oxidation process.

Conventionally, oxy-fuel cutting torch heads and cutting tips have been formed from metal such as brass and copper. The use of these materials is based on their resistance to degradation by corrosion in the industrial environment, their resistance to elevated temperatures, and their ease of fabrication by standard manufacturing practices such as forging and machining. Conventional designs require that the metal cutting tip be installed into the cutting torch head and held firmly in place, in metal-to-metal contact, by means of a threaded metal tip nut. The tip nut is tightened using a wrench until it applies sufficient force on the tip to form a gas tight seal between the metal seats of the tip and the metal torch head seat. Prior cutting tips are typically made from a single piece of metal or are assembled from multiple pieces. Prior cutting tips typically rely on metal-to-metal sealing with the torch head to prevent premature mixing of oxygen and fuel in the cutting tip and torch head.

The prior art head and tip designs have several drawbacks. Cutting tips are subject to damage due to dirt, mishandling, and abuse in the industrial environment. Nicks, scratches, and dents cause the seats to leak when installed into the cutting torch head and subjected to oxygen and fuel gas under pressure. Seat leaks cause operating malfunctions such as backfiring and flashback which can be hazardous. Furthermore, the surface finish of prior metal-to-metal seals is critical, and significant cost is involved in manufacturing and maintaining torches and tips with appropriate surface finishes.

SUMMARY OF THE INVENTION

It is an object of the present invention to provide a simple, inexpensive means by which readily available, industry standard metal cutting tips can be installed leak-free into metal cutting torch heads.

It is a further object of the present invention to extend the useful service life of oxy-fuel cutting torches and tips by making the seating surface between torch head and tip more tolerant of imperfections and less susceptible to damage, requiring costly replacement and repair.

It is a further object of the present invention to reduce the manufacturing cost of oxy-fuel torches and tips by eliminating the need to maintain close tolerances and manufacturing controls on the precision of the seat surface finish and configuration.

It is a further object of the present invention to improve the safety of operation of oxy-fuel cutting torches by providing a leak-free seal between the torch head and cutting tip that can be replaced easily and inexpensively.

According to one aspect of the present invention, a torch head insert usable in an oxy-fuel torch comprises a frustoconical, tubular sidewall including an opening at a first end sized to accept a cutting tip therein, a first flow opening comprising a slot in the sidewall for permitting fluid to flow through the sidewall, a second flow opening in the sidewall for permitting fluid to flow through the sidewall, and an opening at an end of the insert opposite the first end for permitting fluid to flow through the sidewall, the insert comprising a flexible, compressible, resilient material.

According to another aspect of the present invention, an oxy-fuel cutting device comprises a torch head including a first flow passage, a second flow passage, and a cavity having a shaped profile, a cutting tip including a first flow passage, a second flow passage, and an external surface having a shaped profile roughly complementary to the cavity shaped profile, and a tubular insert including an opening at a first end thereof, a side wall, and a flow opening in the sidewall, the insert sized and configured to seal the torch head first flow passage from the torch head second flow passage, the flow opening sized and positioned to permit sealed flow communication between the torch head first flow passage and the cutting tip first flow passage, and between the torch head second flow passage and the cutting tip second flow passage, when the insert is positioned in the cavity and the cutting tip is positioned in the insert.

According to yet another aspect of the present invention, a method of using an oxy-fuel cutting device comprises the steps of positioning a compressible tubular insert inside an internal cavity of a torch head, positioning a cutting tip partially inside the insert, compressing the insert an amount effective to fluidly and mutually seal fluid flow passages in the torch head from each other, and effective to fluidly and mutually seal fluid flow passages in the cutting tip from each other, and flowing cutting fuel and oxygen through the torch head, through the insert, and to the cutting tip.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DETAILED DESCRIPTION OF THE PREFERRED EMBODIMENTS

The above and other objects are achieved by a molded, non-metallic insert that is of a form which replicates the seat configuration of the oxy-fuel cutting torch into which it is intended to be inserted. The insert material is compressible and resilient and allows a standard cutting tip, without special requirements, to be installed into the cutting torch head so equipped with the insert. The molded, non-metallic insert is resistant to the difficult environmental conditions in which it is required to operate in the industrial situations in which it is used. The insert resists elevated temperatures and the chemical and physical effects of the gases it contacts.

In one embodiment, the present invention comprises a molded, silicone rubber frustoconical insert having a surrounding circumferential flange at the large end. The insert is open at both ends. The insert is inserted small end first into the head of an oxy-fuel cutting torch until it contacts the metal surface of the torch head seat. A cutting tip is then inserted into the torch head and held in place against the molded insert by a threaded tip nut. The opening at the small end of the frustocone allows cutting oxygen to pass from a cutting oxygen inlet tube to the cutting tip via a passageway in the torch head. There are also slots in the side wall of the insert which, when properly positioned to line up with the gas inlet tubes of the cutting torch, allow pre-heat oxygen and fuel gas to pass from their respective supply tubes to the cutting tip while a gas tight seal is maintained all around, preventing unwanted mixing of the gases or leakage.

The circumferential flange of the frustocone acts to position the device in the torch head. In one respect it acts as a stop to prevent the insert from moving too deeply into the torch head when a tip is installed and the tip nut is tightened. In a second respect, the flange fits into an undercut in the torch head and prevents the insert from falling out of the torch head inadvertently, when there is no cutting tip in place.

The material from which the molded insert is fabricated is preferably a resilient, non-metallic material, such as silicone rubber, which has the necessary temperature resistance and ability to seal against surface imperfections in the metal cutting tip and torch head. Other non-metallic materials such as polytetrafluoroethylene (PTFE) and the like may also be employed.

Figure 1:
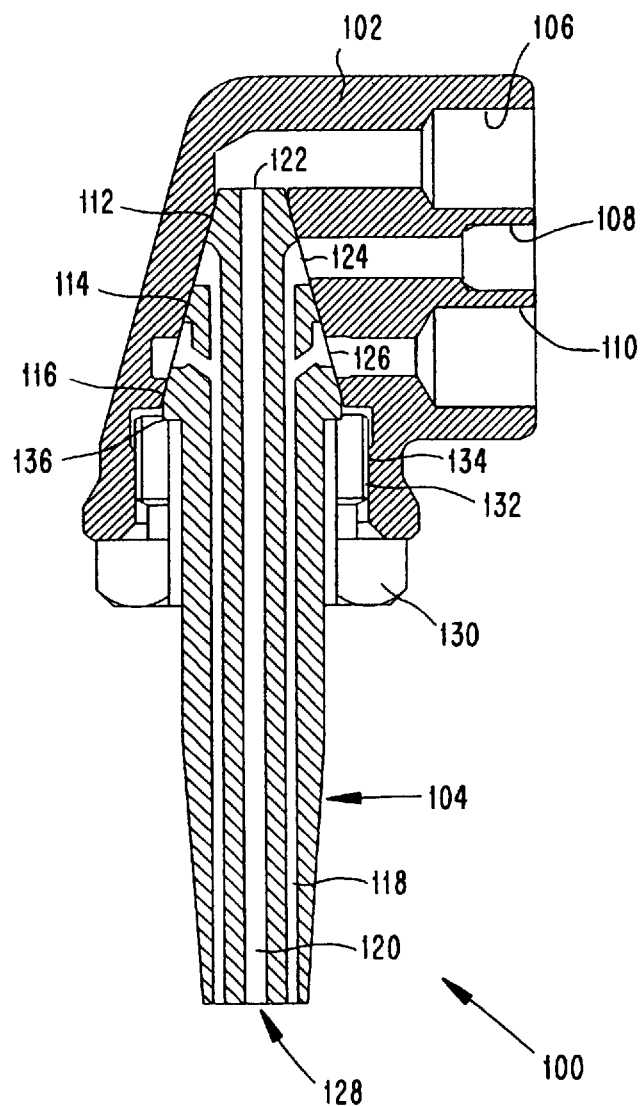
FIG. 1 illustrates a cross-sectional view of a prior art cutting tip installed in a prior art torch head.

Turning now to the drawings figures, FIG. 1 illustrates a prior art combination 100 of a torch head 102, and a cutting tip 104. Torch head 102 includes a conduit 106 for conducting cutting oxygen to the torch head, a conduit 108 for conducting preheat oxygen to the torch head, and a conduit 110 for conducting preheat fuel to the torch head.

As illustrated in FIG. 1, torch head 102 forms seals with the cutting tip 104 at sealing regions 112, 114, and 116. Each sealing region 112, 114, and 116 is intended to circumferentially seal off the flow passages through torch head 102 and the flow passages through cutting tip 104 so that oxygen and fuel do not prematurely mix.

Cutting tip 104 includes an outer longitudinal bore 118 and an inner longitudinal bore 120. Inner longitudinal bore 120 extends from an opening 122, which is in fluid communication with cutting oxygen conduit 106, to cutting tip end 128. Similarly, outer longitudinal bore 118 leads from circumferential opening 124, which is in fluid communication with preheat oxygen conduit 108, and circumferential opening 126, which is in fluid communication with preheat fuel conduit 110, to cutting tip end 128 without fluidly communicating with inner longitudinal bore 120.

Cutting tip 104 is held in torch head 102 with a tip nut 130. Tip nut 130 includes threads 132 which mate with threads 134 on an interior surface of torch head 102, as illustrated in FIG. 1. Cutting tip 104 includes a bearing surface 136 against which tip nut 130 bears to force the cutting tip to sealingly seat against the interior surfaces of torch head 102 at sealing regions 112, 114, and 116. Thus, the seals between the cutting oxygen, preheat oxygen, and preheat fuel flow passages are intended to form by metal-to-metal contact, i.e., at regions 112, 114, and 116, by the outer surfaces of cutting tip 104 bearing against the inner surfaces of torch head 102. Accordingly, as will be readily appreciated by one of ordinary skill in the art, any defect, discontinuity, blemish, scratch, or the like, of the bearing surfaces of torch head 102 and/or cutting tip 104 greatly diminishes the capacity of these surfaces to act as seals between the flow passages. Furthermore, over-tightening of tip nut 130 can damage these mating surfaces, requiring either disposal of both the torch head and the cutting tip, or significant amounts of rework to refinish these surfaces such that they can form the seals required to fluidly isolate the flows of oxygen and fuel.

Figure 2:
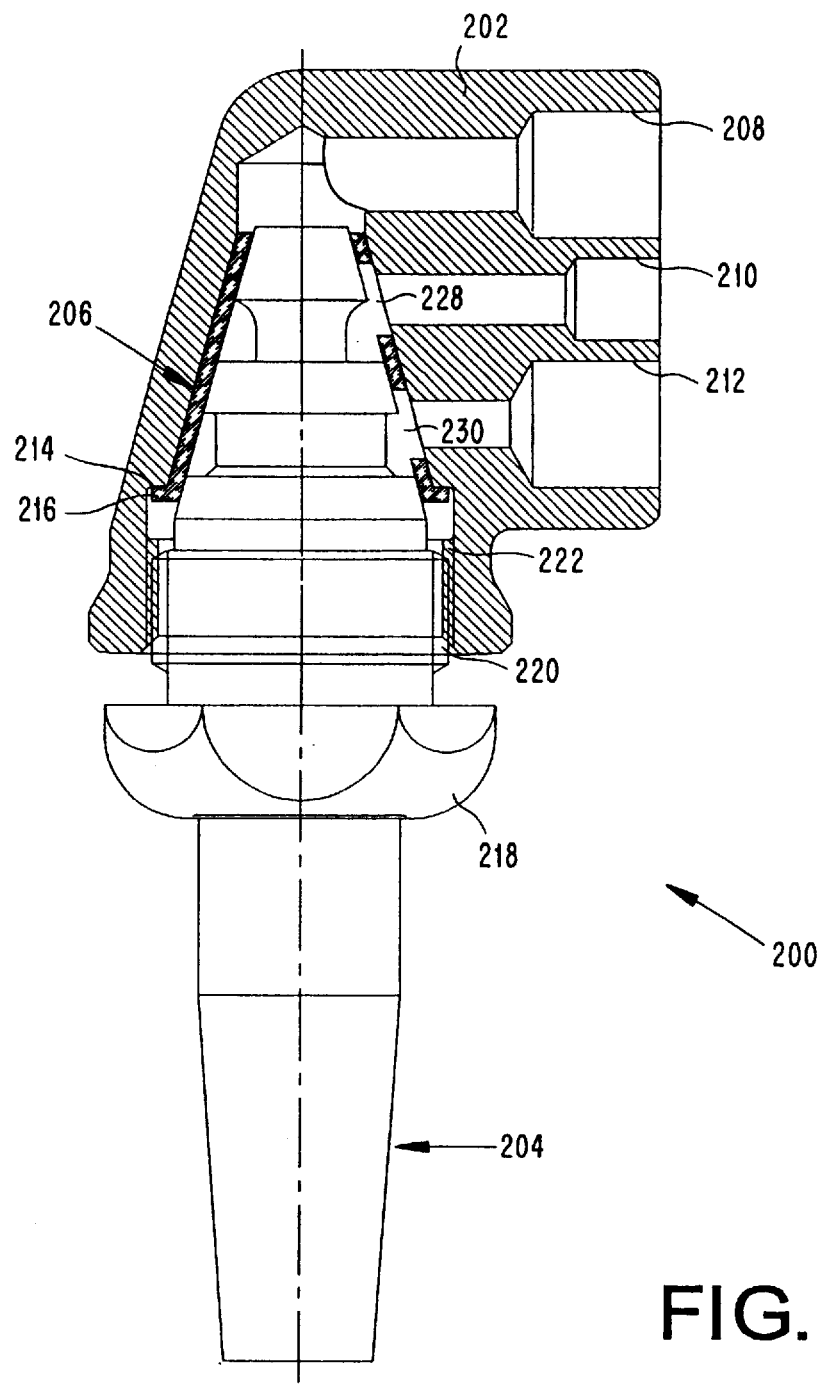
FIG. 2 illustrates a cross-sectional view of a cutting torch head and a cutting tip equipped with an insert according to the present invention.

FIG. 2 illustrates a combination 200 of a torch head 202, a cutting tip 204, and an insert 206 according to the present invention. Torch head 202, as illustrated in FIG. 2, is similar to torch head 102 illustrated in FIG. 1, and cutting tip 204 can be substantially similar to cutting tip 104 illustrated in FIG. 1. The interior surface of torch head 202 and the exterior surface of cutting tip 204 have shaped profiles which are roughly complementary, as illustrated in FIG. 2. Torch head 202 and cutting tip 204 may, in another embodiment of the present invention, take forms different from those illustrated in FIG. 2 without departing from the scope of the invention herein, as will be described in further detail below.

Torch head 202 includes a cutting oxygen conduit 208, a preheat oxygen conduit 210, and a preheat fuel conduit 212, similar to conduits 106, 108, and 110 illustrated in FIG. 1. Cutting tip 204 is held in torch head 202 by a tip nut 218 similar to tip nut 130 illustrated in FIG. 1.

Figure 4:
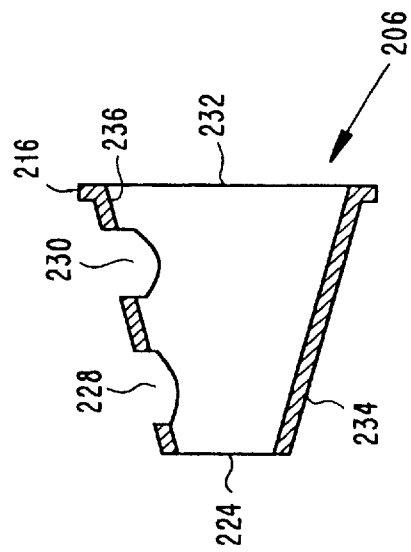
FIG. 4 illustrates a cross-sectional view of the insert illustrated in FIG. 3, taken along line 4—4.
Figure 3:
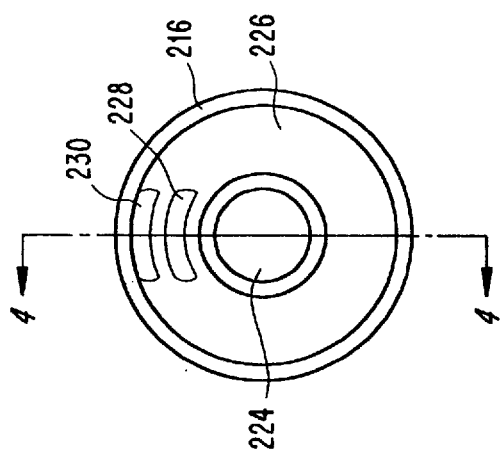
FIG. 3 illustrates an elevational end view of an insert according to the present invention.

Insert 206, which is a frustoconical, tubular insert in the embodiment of the present invention illustrated in FIGS. 2–4, is illustrated in its in-use position, i.e., acting as a seal between cutting tip 204 and torch head 202. Insert 206 includes a circumferential flange 216. Flange 216 locates insert 206 in place longitudinally in the combination of the torch head 202 and the cutting tip 204, so as to ensure that insert 206 is properly seated so as to properly seal the flow passages for oxygen and fuel flowing through the torch head and the cutting tip. Flange 216 locates in an undercut area 214 in the torch head 202, which undercut area 214 is an annular space in the torch head as illustrated in FIG. 2.

Tip nut 218 includes threads 220 which mate with corresponding threads 222 on an interior surface of torch head 202 to hold cutting tip 204 and insert 206 in the torch head. Similar to tip nut 130 illustrated in FIG. 1, tip nut 218 acts on a bearing surface (not illustrated) of cutting tip 204 to force the cutting tip into sealing engagement with insert 206 and torch head 202.

FIG. 3 illustrates an elevational end view of insert 206 according to one embodiment of the present invention. As illustrated in FIG. 3, insert 206 includes a flange 216, a side wall 226, and a center opening 224. Side wall 226, in the embodiment of the insert 206 illustrated in FIG. 3, takes the form of a frustocone. However, insert 206 can have a side wall 226 in the shape other than a frustocone, when the sealing surfaces of cutting tip 204 and torch head 202 are other than frustocones as illustrated in FIG. 2, e.g., a stepped cross-section wherein the side wall 226 of the insert includes both substantially cylindrical sections intersecting with frustoconical or substantially radial sections, or combinations thereof.

Sidewall 226 further includes slots 228, 230 therethrough, i.e., from external surface 234 to interior surface 236. Slots 228 and 230 provide openings in insert 206 for the passage of oxygen and fuel from conduits 210, 212 into the interior fluid conduits of the cutting tip (not shown), which interior fluid conduits are similar in placement and shape to fluid flow conduits 118, 120 illustrated in FIG. 1. If there are other than three fluid flow passages through a torch head with which insert 206 is to be used, more or fewer slots may be provided in side wall 226 to allow insert 206 to seal the torch head and a correspondingly configured cutting tip. Slots 228, 230 have a length along the circumference of side wall 226 less than the entire circumference of the side wall, but are long enough to provide a fluid flow opening such that fluid flowing from preheat oxygen conduit 210 and preheat fuel conduit 212 can flow freely into the preheat oxygen and preheat fuel passages in the cutting tip 204. Slots 228, 230, however, are not so large that they fluidly communicate conduits 208, 210, and 212 outside of cutting tip 204.

FIG. 4 illustrates insert 206 of FIG. 3 taken along cross-section line 4—4, and illustrates the frustoconical shape of the embodiment of insert 206 of FIGS. 2 and 3. As illustrated in FIG. 4, insert 206 further includes an opening 232 larger than center opening 224 and at the end of insert 206 opposite thereto, which is sized to receive the cutting tip 204 therein, as illustrated in FIG. 2.

Insert 206 is formed of a material which is suitable for use as a seal in a torch head. Specifically, insert 206 is formed of a material which is compatible with the fuels used with torch head 202 and cutting tip 204, and which is not subject to significant oxidation at the operating temperatures of the insert. Preferably, insert 206 is constructed of a material which is nonreactive to the fuels and does not significantly oxidize at temperatures below 200° C., and more preferably is nonreactive to the fuels and does not significantly oxidize at temperatures below 250° C. More preferably yet, insert 206 is constructed of a non-metallic material. Most preferably, insert 206 is constructed of silicone or PTFE. Other materials may, however, be used for insert 206 as will be readily appreciated by one of ordinary skill in the art, as long as such other materials have the required chemical and thermal stabilities discussed above.

In the embodiment of the present invention illustrated in FIGS. 2–4, insert 206 takes the shape of a frustocone; the taper of the frustocone illustrated in FIGS. 2–4 is merely exemplary of tapers of inserts according to the present invention. The taper of the insert, when in the form of a frustocone, may be more (to make insert 206 more disc-like) or less (to make insert 206 more tubular) than that illustrated in FIGS. 2–4, depending upon the particular torch head and cutting tip configuration with which insert 206 is intended to be used.

The function of the embodiment of the present invention illustrated in FIGS. 2–4 will now be described. Prior to using torch head 202 with cutting tip 204, insert 206 is positioned in torch head 202 as illustrated in FIG. 2. Specifically, insert 206 is inserted into torch head 202 such that flange 216 is pressed into undercut area 214, which locates the insert properly within the torch head, and center opening 224 positioned in the torch head opposite the end thereof including threads 222. If necessary, insert 206 is then rotated in place such that slots 228, 230 align with preheat oxygen conduit 210 and preheat fuel conduit 212, respectively. Phrased differently, insert 206 is rotated such that slots 228, 230 will allow fluid communication from preheat oxygen conduit 210, and from preheat fuel conduit 212, through side wall 226 of the insert and to the interior flow passages of cutting tip 204 when the cutting tip is positioned in the insert.

Cutting tip 204 is then inserted into torch head 202 such that the exterior surfaces of the cutting tip bear on interior surface 236 of insert 206. Because insert 206 has been constructed to mate with cutting tip 204 and torch head 202, slots 228, 230 provide fluid communication between conduits 210, 212 and the interior flow passages of the cutting tip 204. Furthermore, cutting oxygen conduit 208 is thereby placed in sealed fluid communication with the center flow conduit of cutting tip 204 (not shown).

Tip nut 218 is then placed over cutting tip 204 and threads 220 are mated with threads 222 in torch head 202. The tightening of tip nut 218 presses cutting tip 204 against interior surface 236 of insert 206, thus forming a seal therebetween. Simultaneously, the force exerted by tip nut 218 via cutting tip 204 and insert 206 causes exterior surface 234 of the insert to bear against the interior surfaces of torch head 202 and seal same. Because insert 206 is formed of a compressible material, it is able to compress slightly under the force exerted by tip nut 218 via cutting tip 204, thus preventing destructive contact between the cutting tip and torch head 202. The somewhat elastic nature of insert 206 thus greatly extends the life of both torch head 202 and cutting tip 204, while providing an excellent seal therebetween.

In use, preheat oxygen and preheat fuel are conducted through preheat oxygen conduit 210 and preheat fuel conduit 212, respectively, and into the cutting tip 204, where they combine and exit the cutting tip to preheat a material to be cut. Cutting oxygen is conducted through cutting oxygen conduit 208, into torch head 202 and into the center flow passage (not shown) of cutting tip 204, and exits the cutting tip to cut the material which has been preheated by the preheat oxygen and preheat fuel.

To disassemble the combination 200 illustrated in FIG. 2, tip nut 208 is unscrewed from torch head 202, cutting tip 204 is pulled out of contact with insert 206, and insert 206 is removed from inside torch head 202. If insert 206 has become damaged or worn, it may then be discarded and a new insert 206 inserted in its place. Additionally, if a different fuel is to be conducted through preheat fuel conduit 212 and through slot 230, an insert 206 formed of a material compatible with that fuel may be then inserted into torch head 202, and cutting tip 204 and tip nut 218 reassembled with the torch head.

According to another embodiment of the present invention, combination 200 may be assembled prior to use by first placing insert 206 in place on cutting tip 204, and then inserting this subassembly into the torch head such that slots 228, 230 are in proper alignment with conduits 210, 212. Tip nut 218 is then mounted on cutting tip 204, as described above, and the combination 200 used as described above.

While the invention has been described in detail with reference to preferred embodiments thereof, it will be apparent to one skilled in the art that various changes can be made, and equivalents employed, without departing from the scope of the invention.

What is claimed is:

1. A torch head insert usable in an oxy-fuel torch, comprising:
 a frustoconical, tubular sidewall including an opening at a first end sized to accept a cutting tip therein, a first opening at an end of said insert opposite said first end for permitting fluid to flow through said sidewall, a first flow opening comprising a slot in said sidewall positioned a first distance from said first opening for permitting fluid to flow through said sidewall, and a second flow opening in said sidewall positioned a second distance from said first opening for permitting fluid to flow through said sidewall, said first distance being greater than said second distance, said insert comprising a flexible, compressible, resilient material.

2. A torch head insert according to claim 1, further comprising means at said first end for positioning said insert in said torch head.

3. A torch head insert according to claim 2, wherein said positioning means comprises an outwardly directed flange.

4. A torch head insert according to claim 1, wherein said insert material is nonreactive to fuels usable in an oxy-fuel torch and does not significantly oxidize at temperatures below 250° C.

5. A torch head insert according to claim 1, wherein said insert material is selected from the group consisting of silicone and PTFE.

6. An oxy-fuel cutting device, comprising:
   a torch head including a first flow passage, a second flow passage, and a cavity having a shaped profile;
   a cutting tip including a first flow passage, a second flow passage, and an external surface having a shaped profile roughly complementary to said cavity shaped profile; and
   a tubular insert including an opening at a first end thereof, a sidewall, and a flow opening in said sidewall, said insert sized and configured to seal said torch head first flow passage from said torch head second flow passage, said flow opening sized and positioned to permit sealed flow communication between said torch head first flow passage and said cutting tip first flow passage, and between said torch head second flow passage and said cutting tip second flow passage, when said insert is positioned in said cavity and said cutting tip is positioned in said insert.

7. An oxy-fuel cutting device according to claim 6, wherein said flow opening comprises a slot.

8. An oxy-fuel cutting device according to claim 6, wherein said torch head further comprises a third flow passage therethrough, said cutting tip further comprises a third flow passage therethrough, and said insert further comprises a second flow opening in said sidewall sized and positioned to permit sealed flow communication between said torch head third flow passage and said cutting tip third flow passage when said insert is positioned in said cavity and said cutting tip is positioned in said insert.

9. An oxy-fuel cutting device according to claim 6, further comprising a tip nut for securing said cutting tip to said torch head.

10. An oxy-fuel cutting device according to claim 6, further comprising a second flow opening in said sidewall.

11. An oxy-fuel cutting device according to claim 6, wherein said side wall is frustoconical.

12. An oxy-fuel cutting device according to claim 6, further comprising an opening at an end of said insert opposite said first end for permitting fluid to flow through said sidewall.

13. An oxy-fuel cutting device according to claim 6, further comprising means at said first end for positioning said insert in said torch head.

14. An oxy-fuel cutting device according to claim 13, wherein said positioning means comprises an outwardly directed flange.

15. An oxy-fuel cutting device according to claim 6, wherein said insert is constructed of a flexible, compressible, resilient material.

16. A torch head insert according to claim 15, wherein said insert material is nonreactive to fuels usable in an oxy-fuel torch and does not significantly oxidize at temperatures below 250° C.

17. An oxy-fuel cutting device according to claim 15, wherein said insert material is selected from the group consisting of silicone and PTFE.

18. A method of using an oxy-fuel cutting device comprising the steps of:
   positioning a compressible tubular insert inside an internal cavity of a torch head;
   positioning a cutting tip partially inside said insert;
   compressing said insert an amount effective to fluidly and mutually seal fluid flow passages in said torch head from each other, and effective to fluidly and mutually seal fluid flow passages in said cutting tip from each other; and
   flowing cutting fuel and oxygen through said torch head, through said insert, and to said cutting tip.

19. A method of using an oxy-fuel cutting device according to claim 18, wherein said step of flowing cutting fuel and oxygen comprises flowing cutting fuel and oxygen through a flow opening in a sidewall of said insert.

* * * * *